UNITED STATES PATENT OFFICE.

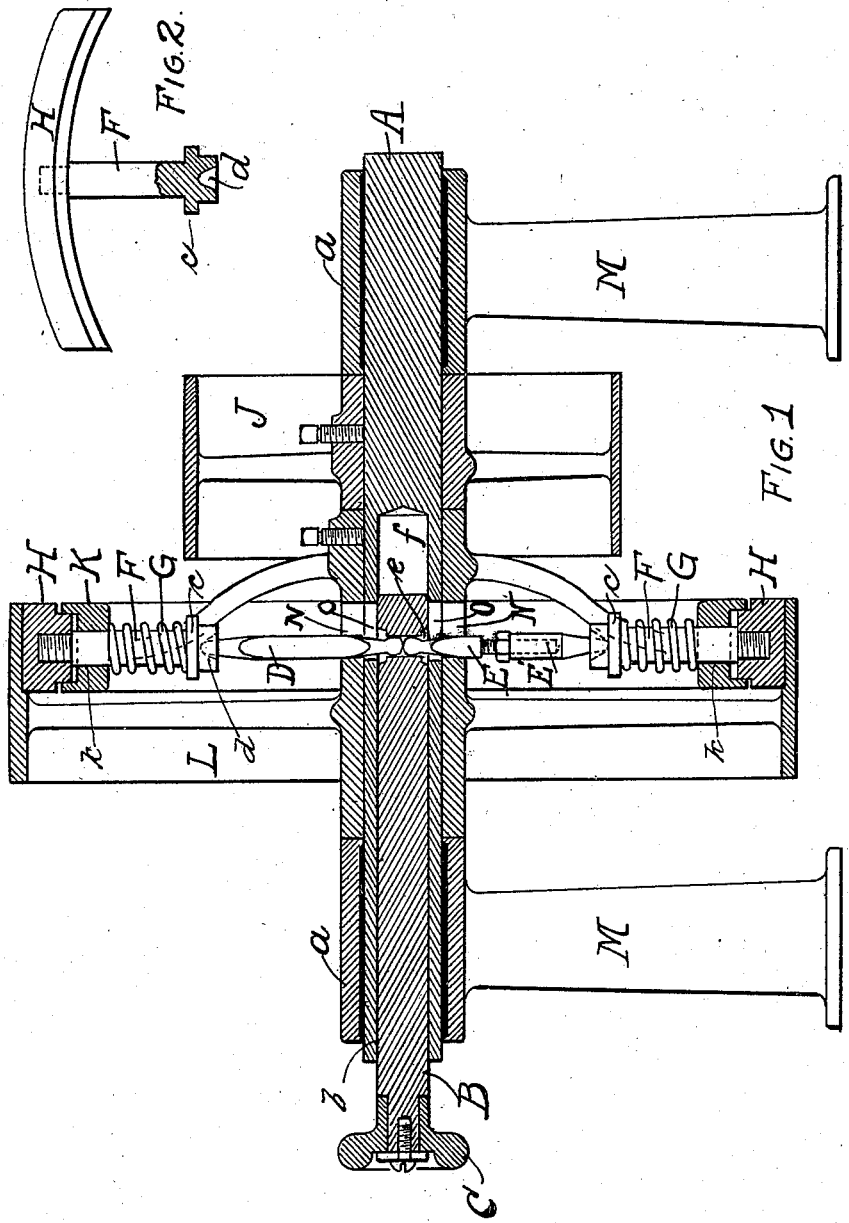

HUGO A. HECKER, OF BELLEVUE, KENTUCKY, ASSIGNOR TO THE F. M. WATKINS COMPANY, OF CINCINNATI, OHIO.

FRICTION-CLUTCH.

SPECIFICATION forming part of Letters Patent No. 674,164, dated May 14, 1901.

Application filed July 10, 1899. Serial No. 723,325. (Model.)

*To all whom it may concern:*

Be it known that I, HUGO A. HECKER, a citizen of the United States, residing in Bellevue, in the county of Campbell, State of Kentucky, have invented certain new and useful Improvements in Friction-Clutches, of which the following is a full, clear, and exact description, reference being had to the accompanying drawings, forming part of this specification.

My invention relates to clutches for coupling together shafts and pulleys rotating at a high speed; and it consists of a certain novel construction and arrangement of parts, to be hereinafter particularly pointed out and claimed, whereby a simple and extremely durable clutch is provided and which may be readily and easily coupled by frictional contact at a very high rate of speed.

In the drawings, Figure 1 is a longitudinal cross-section of pulleys and shaft provided with my clutch mechanism. Fig. 2 is a side view in detail of one of the friction-shoes.

A is a shaft mounted in suitable journal-bearings $a\ a$ on the standards M M. This shaft is provided with a central bore $b$ of suitable depth, or the shaft may be hollow throughout.

J is the fixed pulley, and L the loose pulley, mounted on shaft A. Fixed to the shaft A, with its periphery within the rim of the loose pulley L, is the frame or flanged wheel K. Fitted between the flanges of the wheel K on opposite sides are the segment-shoes H H, provided with studs F F, which pass through openings $k$ in the rim of the wheel K and are provided with collars $c\ c$, between which collars and the wheel-rim coiled springs G G bear to keep the shoes H H in close contact with the wheel K. The inner ends of these two studs F F are provided with central conical recesses $d\ d$, within which the rounded outer ends of the toggle-arms D E bear. The recesses will be comparatively deep, so as to retain the ends of the toggle-arms in place when moved to an angular position by the sliding rod, and thus avoid the use of small pins or other devices for holding the parts together.

Fitted within the bore $b$ in the driving-shaft A is a rod B, provided with a handle C. The inner end of this rod B is provided with an opening $e$, within which opening the rounded inner ends of the toggle-arms D E abut. When the rod B is drawn out to straighten the toggle-arms D E, the segment-shoes H H will be pushed out against the inner surface of the rim of the pulley L. For the purpose of adjusting the amount of this pressure and taking up the wear one of the toggle-arms, as E, is made in two parts E E', the one threaded within the other. Now when the rod B is pushed in it will carry with it the inner ends of the toggle-arms and relieve at once the pressure on the springs G G and permit them to draw away the shoes from the rim of the pulley L, and thus disconnect it. In order to allow this movement of the toggle-arms D E, I form slots O O of suitable length in the shaft A and N N in the hub of the flanged wheel K.

The operation I believe will be sufficiently clear from the above description. When the sliding rod B is drawn out, as shown in Fig. 1, the pulley L will be coupled to the shaft and pulley J; but the moment the rod B is pushed in the springs will act against the collars $c$ and the shoes H H will thereby be withdrawn from the rim of pulley L, thus disconnecting the same.

The abutting ends of the toggle not being hinged together, but merely forming a loose joint held by the rod B, it will be evident that to regulate the pressure and to take up wear only one point of adjustment is necessary, which I provide by an ordinary threaded coupling, as described. In thus constructing the parts of my clutch the joints or connections between the toggle-arms and the other parts are formed without the use of small pins, thereby rendering the same exceedingly durable. The springs G G also serve to hold or retain the parts intact during the movement of the toggle-arms.

Of course it will be evident that the position of the parts may be reversed or changed without in any way departing from my invention. The pulley L may be the driving and pulley J the driven member, or they may be mounted on separate shafts. The flanged wheel K is only intended as a guide for the shoes H, and evidently any guide for the shoes could be employed without departing from my invention, while many changes of position will also readily suggest themselves to the mechanic.

Having thus described my invention, what I claim, and desire to secure by Letters Patent, is—

In a friction-clutch, the combination of a rotating shaft provided with a central bore and slots O O, a loose pulley mounted thereon, a sliding rod in said bore having an opening e, a shoe-carrying frame or wheel having openings k k keyed to the shaft and running within the rim of the loose pulley, friction-shoes having studs passing through openings k and having comparatively deep recesses d in their inner ends adapted to solely retain the outer ends of the herein-mentioned toggle-arms in place during their movement by the sliding rod, springs normally to hold said shoes against the shoe-carrying frame and out of contact with the loose pulley, a pair of toggle-arms without pivots at their ends and having their outer ends loosely fitting and oscillating within the recesses in the studs and their inner ends passing through slots O O and abutting loosely and oscillating within the opening e in the sliding rod, substantially as shown and described.

HUGO A. HECKER.

Witnesses:
W. F. LOWE,
W. D. JOHNSON.